Inventors
John R. Purcell
John M. Brooks
By: Roland A. Anderson
Attorney

Inventors
John R. Purcell
John M. Brooks
By:
Roland A. Anderson
Attorney 3,428,891
Patented Feb. 18, 1969

3,428,891

METHOD FOR EVALUATING THE STABILITY AND OPERATING CHARACTERISTICS OF COMPOSITE SUPERCONDUCTORS

John R. Purcell, Downers Grove, and John M. Brooks, Lemont, Ill., assignors to the United States of America as represented by the United States Atomic Energy Commission Filed Mar. 22, 1967, Ser. No. 625,917
U.S. Cl. 324—64 6 Claims
Int. Cl. G01r *27/14;* H01f *7/22*

ABSTRACT OF THE DISCLOSURE

A method for evaluating the stability of composite superconductors by passing a variable current through a short sample of the composite superconductor wherein the superconductor has been made discontinuous and measuring the voltage drop along the coating of the composite superconductor from one side of the discontinuity.

*Contractural origin of the invention*

The invention described herein was made in the course of, or under, a contract with the United States Atomic Energy Commission.

*Background of the invention*

In general, the present invention relates to composite superconductors and more particularly to methods for evaluating the operating characteristics of such superconductors.

As the requirements for larger electromagnets with higher fields increase, the importance of superconducting magnets increases. Present superconducting coils and magnets are generally constructed using a composite superconductor wherein a superconductor is surrounded by a coating having high electrical conductivity at superconducting temperatures. One difficulty encountered in the manufacture of superconducting coils and magnets from the composite superconductor is the ability to reliably predict the operational characteristics of the composite superconductor when formed into a coil or magnet. Present techniques rely heavily on an empirical or trial and error method of construction, whereby magnet performance is ascertained only after actual construction. There exists in the superconducting art a requirement for a method which may reliably predict the stability and operating characteristics of a composite superconductor when wound into a magnet or coil.

It is therefore one object of the present invention to provide a method for evaluating the stability and operating characteristics of composite superconductors.

It is another object of the present invention to provide a method by which the stability and operating characteristics of composite superconductors may be reliably predicted when such conductors are formed into a coil or magnet.

Other objects of the present invention will become more apparent as the detailed description proceeds.

*Summary of the invention*

In the present invention, a short sample of the composite superconductor is taken and a portion of the superconductor contained therein is removed to interrupt the continuity thereof. The short sample composite superconductor is placed in a predetermined magnetic field and cooled to the temperature required for establishing superconductivity in the superconductor. A variable current is applied to the superconductor and the value thereof recorded. The voltage drop of the coating about the superconductor is measured from the discontinuity in the superconductor to a distance spaced therefrom along the coating. The obtained voltage-current relationship is a measure of the stability and operating characteristics of the composite superconductor when wound in a coil or magnet.

*Brief description of the drawings*

Further understanding of the present invention may best be obtained by consideration of the accompanying drawings wherein:

As illustrated in FIG. 1, a short sample is taken of a composite superconductor 10 having an inner superconductor 12 surrounded by an outer coating 14 of high electrical conductivity at superconducting temperatures.

A portion of the superconductor 12 is removed so that the superconductor is discontinuous within the length of the composite superconductor 10. The outer coating 14 of the composite superconductor 10 is maintained continuous. For the present invention the short sample composite superconductor 10 is then placed in a predetermined magnetic field and cooled to a temperature sufficient to cause the superconductor 12 to become superconducting. A variable current of known value is applied to the superconductor 12 and a voltmeter 16 is attached to the outer coating 14 of the composite superconductor 10 so as to measure the voltage drop a predetermined distance along the length of the coating 14 from one side of the discontinuity of the superconductor 12. The determination of the length over which the voltage drop is measured is not critical for the practice of the present invention. It has been found preferred that it not be measured to the end of the composite superconductor 10 in order that end effects may be avoided. Thus, it is preferred that the voltmeter be positioned on the coating 14 of the short sample composite superconductor 10 from one side of the discontinuity to a distance therealong short of the ends of the coating 14. It is to be noted that the voltage drop is not measured across the discontinuity in the superconductor 12. The applied current readings together with the associated obtained voltmeter readings are then recorded and furnish a measure of the stability of the composite superconductor 10, as hereinafter will be appreciated.

Figure 2:
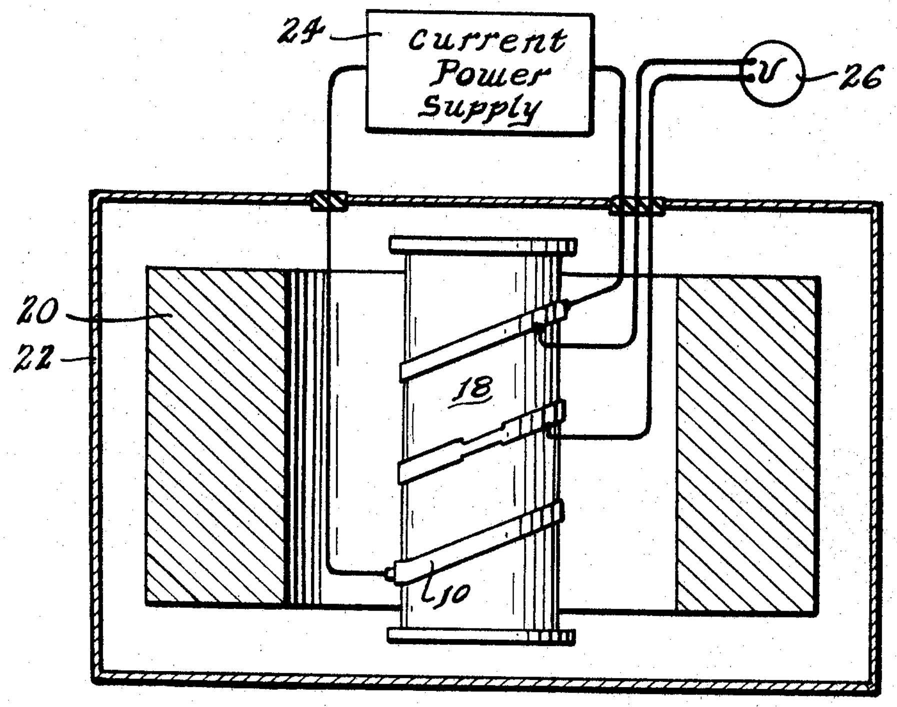
FIG. 2 is an apparatus for the practice of the present invention.

Turning to FIG. 2, an apparatus is shown for the general practice of the aforedescribed method. The short sample composite superconductor 10 is spirally wound on a Micarta bobbin 18 which is disposed within the bore of a magnet 20. The magnet 20 produces a variable predetermined magnetic field having values that the composite superconductor 10 will operate in when wound in the intended coil or magnet. The magnet 20 and bobbin 18 are immersed in a cryostat 22 wherein they may be cooled to a temperature such that the superconductor 12 within the composite superconductor 10 may become superconducting. The ends of the short sample composite superconductor 10 are connected to a current power supply 24. A recording voltmeter 26 is connected to the outer coating 14 of the short sample composite superconductor 10 from one side of the discontinuity of the superconductor 12 therein to a point therealong short of the end of the composite superconductor 10.

The operation of the apparatus in FIG. 2 is the same as hereinbefore described with the current through the superconductor 12 from the power supply 24 being steadily increased from an initial value and the associated voltmeter recordings being taken therefor at a predetermined value of magnetic field from magnet 20.

Figure 1:
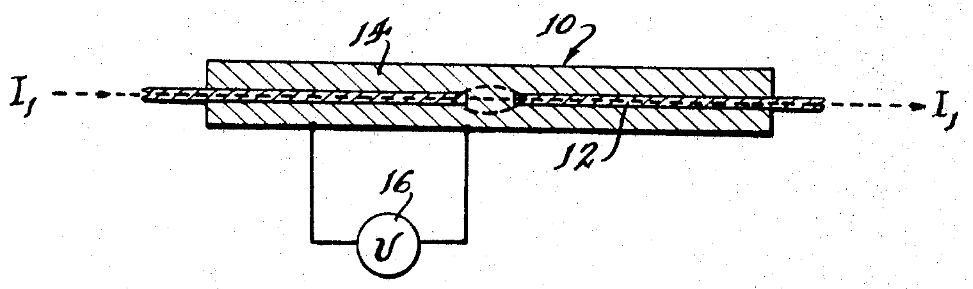
FIG. 1 is a cross section drawing of a typical composite superconductor.
Figures 3, 4:
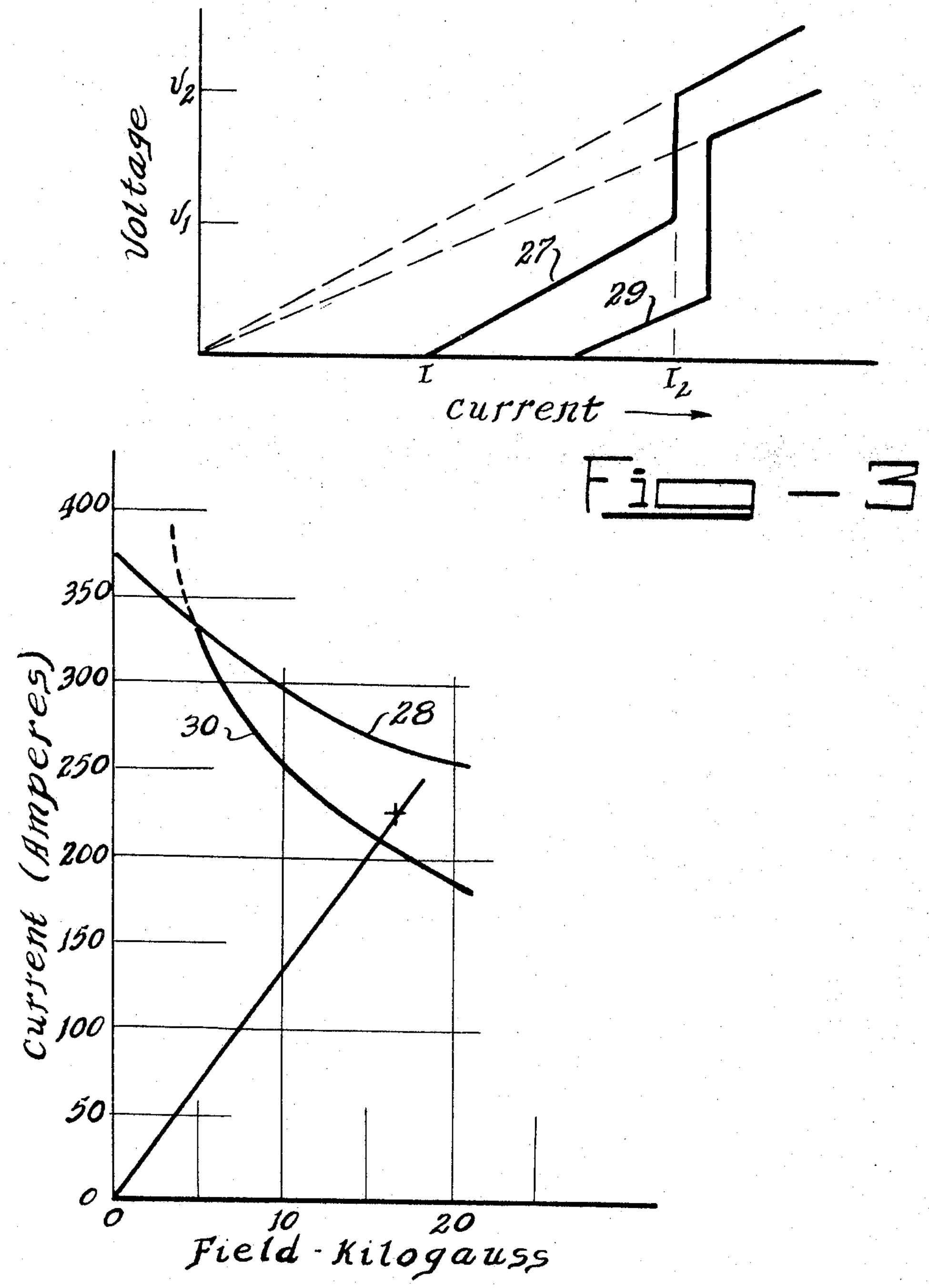
FIG. 3 is a typical plot of current-voltage readings obtained using the apparatus of FIG. 2.
FIG. 4 is a typical plot of stability curves for a composite superconductor produced by the method of the present invention.

Typical voltage-current readings obtained with the apparatus of FIG. 2 using the composite superconductor of FIG. 1 are illustrated in FIG. 3. Each of the plots 27 and 29 represents current-voltage readings obtained with the composite superconductor 10 subjected to different magnetic fields from magnet 20. The significance of the current-voltage relationships may best be understood by referring to typical plot 27 obtained with a particular magnetic field. It is to be noted that for a current increase up to a certain value ($I_1$) no voltage is recorded on the voltmeter 26. During this condition the current passes through the superconductor 12 into the coating 14 at the start of the discontinuity and back into the superconductor 12 at the end of the discontinuity. This is shown in dotted lines in FIG. 1. Thus, for current values up to $I_1$, the total current applied from the current power supply 24 is carried by the superconductor 12 and no current flows in the coating 14 except at the discontinuity of the superconductor 12. The current $I_1$ represents the maximum current-carrying capacity of the superconductor 12 in the particular predetermined magnetic field. When the applied current is increased beyond the value $I_1$, the voltmeter 26 will commence to register voltage. This voltage will linearly increase until an applied current value $I_2$ is reached, giving a voltage reading $V_1$. The current capacity of the superconductor is $I_1$ and, as the applied current exceeds the value $I_1$, the excess current above the value $I_1$ flows into and along the coating 14, giving a voltage drop therealong which is recorded by the voltmeter 26. The excess current flowing in the outer coating 14 causes heating thereof, which heat is carried away by the cooling medium (such as liquid helium) in the cryostat 22. At this time, at the surface of the coating 14, the cooling medium is in a state of nucleate boiling to effect the heat transfer. It is to be remembered that for the current increase of $I_1$ to $I_2$ the cooling medium in the cryostat 22 is capable of effecting heat transfer from the coating 14 so that the superconductor 12 remains in its superconducting state and carries its maximum rated current $I_1$ throughout this condition.

When the applied current attains the value $I_2$, the current flowing in the outer coating 14 heats the coating 14 to a degree such that film boiling of the cooling medium utilized in the cryostat 22 is effected. At this point, the heat transfer from the coating 14 is not rapid enough and permits rapid heating of the superconductor 12 to destroy the superconducting state thereof. Thus, at the applied current value $I_2$, the superconductor 12 becomes normal. The normalcy of the superconductor 12 propagates outwardly from the discontinuity thereof. When the superconductor 12 goes normal, it assumes a high resistance with respect to the coating 14 and the applied current is forced therefore to flow in the coating 14. The rapid increase in current flowing in the outer coating 14 gives a rapid increase in the voltage drop therealong, as recorded by voltmeter 26, to a value $V_2$, as illustrated in FIG. 3. Further increases in the current applied to the short sample composite superconductor 10 result in a linear relationship for voltage drop along the coating 14, as shown in FIG. 3. The current-voltage relationship, as illustrated in FIG. 3, provides three areas of interest wherefrom the predictability of the stability of the composite superconductor being tested may be ascertained for a particular magnetic field. The first, where the applied current is increased from its initial value to $I_1$, is a measure of the current-carrying capacity of the superconductor 12. The second, from the applied current value of $I_1$ to $I_2$, is a measure of the current-carrying capacity of the composite superconductor 10 with suitable cooling, with the superconductor 12 being maintained in a superconducting state. The third, above the value $I_2$, denotes instability of the composite superconductor 10 as the maximum current therefor is exceeded.

The application of the aforedescribed method in the design and construction of a superconducting coil or magnet may better be understood by considering FIG. 4 wherein stability curves for short samples of a cable completely exposed to liquid helium are set forth. These curves were obtained for 0.254 mm. heat-treated niobium-33% zirconium cabled with six strands of .305 mm. copper. As previously described, the method is accomplished by varying the applied current and measuring the associated voltage drops along the outer cabled copper coating of the composite superconductor wherefrom the operating characteristics of the metal coating and superconductor are determined for a particular magnetic field. With the method repeated for differing magnetic fields, the curves of FIG. 4 may be obtained. For example, curve 28 is the stability curve for the copper coating surrounding the superconductor. The plotted points determinative of this curve are the currents $I_2$ as measured for different magnetic fields. The curve 30 is representative of the current-carrying capacity for the niobium-zirconium superconductor. The plotted points for this curve are obtained using the value $I_1$, again using different magnetic fields therefor. For a desired magnet a load line may be constructed and, by observing the intersection of the magnet load line with respect to the plotted stability curves as shown in FIG. 3, one may ascertain whether the composite superconductor will be suitable for the construction of the desired magnet. For example, if the magnet load line indicates that the magnet will operate above the curve 28 (the stability curve for the copper coating), then the composite superconductor tested is unsuited therefor, since it will be unstable. Construction of a magnet with this type of operating characteristics and composite superconductor will result in a magnet giving a violent quench with possible resulting damage therefrom. If the load line and operating point of the magnet show operation below the curve 28, then the composite superconductor may be used therefor and will operate stably. If the load line and operating point of the magnet show operation between the curve 28 and the curve 30, then the composite superconductor may be used therefor and will operate stably. However, in this condition, the efficiency of the magnet will be lowered due to heat loss and resulting operation will be more costly than in the most favorable operating conditon. If the load line and operating point of the magnet show operation below the curve 30, then the composite superconductor will be operating in its most favorable condition and will do so with little heat loss, quite stabily, and least expensively.

Thus, using the method of the present invention, the stability and operating characteristics of a coil or magnet formed from a particular composite superconductor may be reliably predicted prior to the winding thereof.

The embodiments of the invention in which an exclusive property or privilege is claimed are defined as follows:

1. A method for measuring the operating characteristics of a superconductor having thereabout a coating of high electrical conductivity at superconducting temperatures comprising interrupting the electrical continuity of said superconductor, cooling said superconductor and coating to a temperature to cause said superconductor to assume a superconducting state, generating a magnetic field of known value about said superconductor and coating, applying a current of known value to said superconductor, and measuring the voltage drop along said coating from a point thereon proximate said electrical discontinuity of said superconductor to a predetermined point therefrom.

2. The method of claim 1 further including varying said current applied to said superconductor, measuring the value of said varied applied current, and varying the generated known value magnetic field.

3. The method according to claim 1 wherein said voltage drop is measured along said coating from a point spaced from the end thereof to a point proximate the side of said superconductor discontinuity adjacent said end.

4. A method for measuring the operating characteristics of a superconductor having a material thereabout of high electrical conductivity at superconducting temperatures comprising selecting a short sample of said superconductor having said material thereabout, removing from said short sample a portion of said superconductor to interrupt the continuity thereof, cooling said short sample to a superconducting temperature, generating a magnetic field of predetermined value about said short sample, applying a current of known value to said short sample, and measuring from one side of the discontinuity of said superconductor the voltage drop caused in said material by said current.

5. The method of claim 4 including increasing said applied current to said short sample in value, recording the increasing values of said applied current, and measuring from one side of the discontinuity of said superconductor the voltage drop caused in said material by said current.

6. The method of claim 5 wherein said steps of applying said current to said short sample, increasing the value of said applied current, recording the increasing values of said applied current and measuring the voltage drop in said material by said current are repeated with magnet fields of different known values generated about said short sample.

References Cited

UNITED STATES PATENTS

| | | | |
|---|---|---|---|
| 3,283,245 | 11/1966 | Stauffer | 324—64 |
| 3,356,864 | 12/1967 | Giaver | 324—71 X |

RUDOLPH C. ROLINEC, *Primary Examiner.*

E. E. KUBASIEWICZ, *Assistant Examiner.*

U.S. Cl. X.R.

335—216